(12) United States Patent
Tseng

(10) Patent No.: US 7,640,383 B2
(45) Date of Patent: Dec. 29, 2009

(54) METHOD AND RELATED APPARATUS FOR CONFIGURING LANES TO ACCESS PORTS

(75) Inventor: Wayne Tseng, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 219 days.

(21) Appl. No.: 11/162,031

(22) Filed: Aug. 26, 2005

(65) Prior Publication Data
US 2006/0112210 A1    May 25, 2006

Related U.S. Application Data

(60) Provisional application No. 60/522,771, filed on Nov. 5, 2004, provisional application No. 60/522,812, filed on Nov. 9, 2004.

(51) Int. Cl.
*G06F 13/00* (2006.01)
(52) U.S. Cl. .................. 710/104; 710/316
(58) Field of Classification Search .............. 710/8, 710/10, 104, 316–317
See application file for complete search history.

(56) References Cited

U.S. PATENT DOCUMENTS

| | | | | |
|---|---|---|---|---|
| 4,014,005 A | * | 3/1977 | Fox et al. ............... | 710/317 |
| 4,543,651 A | * | 9/1985 | Chang .................. | 370/220 |
| 5,467,348 A | * | 11/1995 | Fujii et al. ............. | 370/468 |
| 5,555,243 A | * | 9/1996 | Kakuma et al. .......... | 370/352 |
| 5,648,959 A | * | 7/1997 | Ilyadis et al. ........... | 370/445 |
| 5,768,270 A | * | 6/1998 | Ha-Duong .............. | 370/388 |
| 5,978,370 A | * | 11/1999 | Shively ................ | 370/370 |
| 6,009,496 A | * | 12/1999 | Tsai .................... | 711/103 |
| 6,496,888 B1 | * | 12/2002 | Pole, II ................ | 710/110 |
| 6,633,946 B1 | | 10/2003 | Hendel | |
| 6,732,219 B1 | * | 5/2004 | Broyles ................ | 710/316 |
| 6,760,272 B2 | * | 7/2004 | Franz et al. ............ | 365/230.05 |
| 6,792,473 B2 | * | 9/2004 | Harnois et al. .......... | 709/239 |
| 7,016,345 B2 | * | 3/2006 | Li ..................... | 370/360 |
| 7,069,376 B2 | * | 6/2006 | Mathewson et al. ...... | 710/316 |
| 7,085,875 B1 | * | 8/2006 | Yona et al. ............ | 710/307 |
| 7,106,728 B1 | * | 9/2006 | Li ..................... | 370/386 |
| 2002/0019904 A1 | * | 2/2002 | Katz .................. | 710/316 |
| 2002/0095549 A1 | * | 7/2002 | Matsunami et al. ...... | 711/114 |
| 2004/0083326 A1 | * | 4/2004 | Wang et al. ............ | 710/317 |
| 2004/0088469 A1 | * | 5/2004 | Levy .................. | 710/316 |

OTHER PUBLICATIONS

"PCI Express and Advanced Switching: Evolutionary Path to Building Next Generation Interconnects" 2003 by David Mayhew and Venkata Krishnan.*
"Creating a PCI Express Interconnect" 2002 by Ajay V Bhatt.*

* cited by examiner

*Primary Examiner*—Paul R Myers
(74) *Attorney, Agent, or Firm*—Winston Hsu

(57) ABSTRACT

A method and related apparatus for different lane and access port configurations of a bus. Such different configurations can apply to different applications requirements. In a preferred embodiment of the invention, a chipset can configure 18 lanes to 4 access ports of a peripheral communication interconnect express bus for selectively 4 different configurations. A first configuration provides single access port with 16 lanes, and two access ports for each has one lane. A second configuration provides two access ports for each has eight lanes, and two access ports for each has single lane. A third configuration provides one access port with eight lanes, two access ports for each has four lanes and another one access port with single lane. And a fourth configuration provides four access ports for each has four lanes.

20 Claims, 7 Drawing Sheets

| | L00 | L01 | L02 | L03 | L04 | L05 | L06 | L07 | L08 | L09 | L10 | L11 | L12 | L13 | L14 | L15 | L16 | L17 |
|---|---|---|---|---|---|---|---|---|---|---|---|---|---|---|---|---|---|---|
| Configuration A | PE0 ||||||||||||||||| 
| Configuration B | PE0 |||||||| PE2 |||||||| PE1 | PE3 |
| Configuration C | PE0 |||| PE1 |||| PE2 |||| PE3 |||| PE1 | PE3 |
| Configuration D | PE0 || PE1 |||| PE0 || PE2 |||| PE3 |||| PE1 | PE3 |
| Configuration C' | PE0 |||| PE1 |||| PE2 |||||||| Idle | PE3 |

Fig. 6

| | PE0 | PE1 | PE2 | PE3 |
|---|---|---|---|---|
| Configuration A | x16 | x1 | Idle | x1 |
| Configuration B | x8 | x1 | x8 | x1 |
| Configuration C | x8 | x1 | x4 | x4 |
| Configuration D | x4 | x4 | x4 | x4 |

METHOD AND RELATED APPARATUS FOR CONFIGURING LANES TO ACCESS PORTS

CROSS REFERENCE TO RELATED APPLICATIONS (1) This is a Non-provisional of U.S. provisional application No. 60/522,771, filed Nov. 5, 2004. (2) This a Non-provisional of U.S. provisional application No. 60/522,812, filed Nov. 9, 2004.

BACKGROUND OF THE INVENTION

1. Field of the Invention

The present invention relates to a method and apparatus for configuring a number of lanes to be connected to each access port of a bus, and more particularly, to a method and apparatus for realizing different lane configurations with an identical circuit design.

2. Description of the Prior Art

A computer system is one of the most important hardware devices in modern information society. As the computer system is widely used in various applications, different requirements of different applications are demanded. For example, a personal computer is often used to play multi-media video and audio, so the efficiency of network information transmission management is regarded, on the other hand, the efficiency of image signal processing is ignored. Therefore, how to satisfy various requirements of different applications in the computer system is becoming more important.

In general, a computer system includes: a central processing unit, a system memory for providing memory resources, a chipset, and various peripheral devices/circuits. The central processing unit executes programs, processes data and handles the computer functions. The system memory can be a dynamic random access memory. The peripheral devices/circuits includes: a display card with capable of accelerating an image processing efficiency, a network card with able to be connected to a network for manipulating network data transmission, and a variety of input/output interfaces and nonvolatile storage devices. The chipset is connected between the central processing unit, the system memory, and the peripheral devices/circuits for coordinating and managing data transmission among these devices.

In order to manage the data transmission, the chipset is connected to the peripheral devices/circuits via a bus, so that each peripheral device/circuit can access the central processing unit and the system memory via the bus and the chipset.

In order to improve the efficiency for each peripheral device/circuit to access the data from the bus, a modern bus standard is designed to realize a scalable data transmission bandwidth (total data flew in a unit period). For example, in a new generation peripheral communication interconnect-express (PCIE) standard, the chipset is connected to a peripheral device via a bus of an access port. The bus of different access ports may have different numbers of physical signal transmission lanes. Access ports with different numbers of lanes can serve different bandwidths to a corresponding peripheral device. For example, there have an access port A with a lane and an access port B with two lanes. Since any two lanes have equal data transmission bandwidths, the access port B can transmit data by the two lanes at the same time. That is, data transmission bandwidth of access port B is twice of the data transmission bandwidth of the access port A. Likewise, an access port with four lanes can transmit data over four times (×4) data transmission bandwidth; and an access port with eight lanes can transmit data over a eight times (×8) data transmission bandwidth; and an access port with sixteen lanes can transmit data over a sixteen times (×16) data transmission bandwidth.

In a conventional chipset, the access port configured to a fixed numbers of lanes. For example, a conventional chipset provides an access port with 16 lanes, and one or two access ports with single lane. The access port with 16 lanes is used to connect to a display card, so that the chipset can use 16 times data transmission bandwidth to transmit data to improve the image processing efficiency of the computer system. However, as mentioned previously, many applications do not need to ultimate image processing efficiency. Instead, in some applications, four or eight times data transmission bandwidth is needed to serve the other kinds of peripheral devices. For example, a computer system being as a server needs more than one access port with 4 lanes to manage its network peripheral devices. That is to say, since the conventional chipset has fixed numbers of lanes, the access port can neither provide various data transmission bandwidths applied in different applications, nor meet the requirements of different computer systems in different applications.

SUMMARY OF THE INVENTION

The invention provides a method and related apparatus to overcome the above-mentioned problems.

The present invention provides an apparatus for configuring lanes to an access port, the apparatus includes: a plurality of lanes for transmitting data; a plurality of access modules; and a configuration module coupled to the lanes and the access modules, determining a number of lanes for each access modules; wherein the configuration module receives a setting signal and configuring each lanes to one of the access modules or to none of the access modules.

The present invention also provides a method for configuring M lanes to N access modules, said access module couples to an access port for connecting to an external peripheral device, the method includes: configuring said lane to one or none of the N access modules according to a setting signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 6 is a table listing the access ports configured to the lanes under different configuration shown in FIG. 2 to FIG. 5.

FIG. 7 is another table listing the access port configuration supported by the present invention.

DETAILED DESCRIPTION

Figure 1:
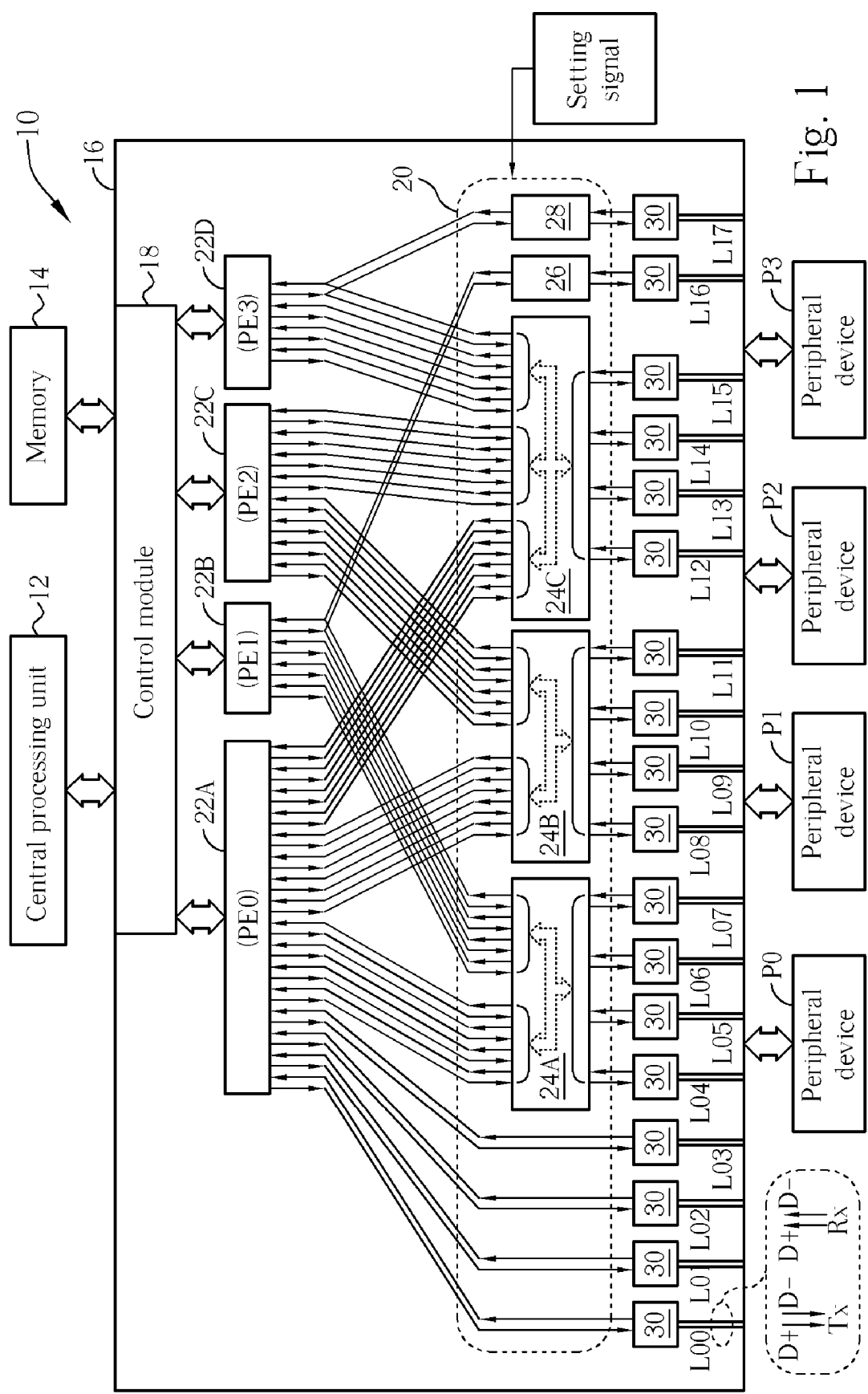
FIG. 1 is a functional block diagram of an embodiment according to the present invention.

Please refer to FIG. 1, which is a functional block diagram of an embodiment of a computer system 10 according to the present invention. The computer system 10 includes a central processing unit 12, a memory 14, a chipset 16, and a plurality of peripheral devices/circuits (ex. P0~P3 as shown in FIG. 1).

The central processing unit 12 is used for processing data, and executing programs to control the computer system 10. As a system memory of the computer system 10, the memory 14 can be a dynamic random access memory, which provides the memory resources for the computer system 10. For example, the memory 14 stores the programs and data for the central processing unit 12 operating. The peripheral devices P0 to P3 can include a variety of add-on cards and circuits, such as a network card used to connect the computer system 10 to a network, a display card or a sound card used to accelerate image and audio processing efficiency, or an interface card for a storage device, such as hard disk array control card for managing hard disk array. The chipset 16, regarding as a bus management circuit, coordinates data transmission between the peripheral devices and the central processing unit 12 and the memory 14.

The chipset 16 includes a control module 18, a plurality of access modules (ex. four access modules 22A to 22D as shown in FIG. 1), and a plurality of input/output circuit 30 which form a plurality of lanes, so that the chipset 16 can communicate with the peripheral devices.

As shown in FIG. 1, the chipset 16 haves 18 lanes L00~L17. The control module 18 accesses the central processing unit 12 and the memory 14 to exchange data with the central processing unit 12 and the memory 14. Each of the access modules 22A to 22D is used to serve one corresponding peripheral device. When an access module connects to a peripheral device via one or a plurality of lanes, the access module can help data exchanging via the control module 18 between peripheral device and the central processing unit 12 and the memory 14.

Besides the access modules and lanes/input/output circuits, in order to realize a bus configuration management mechanism of the present invention, the chipset 16 in the present invention further includes a configuration module 20 coupled between the access ports 22A~22D and the input/output circuits 30. The configuration module 20 would receive a setting signal. According to the setting signal, the configuration module 20 assigns lanes to each access ports 22A~22D with connected to the peripheral devices P0~P3. That is, according to the setting signal, the configuration module 20 assigns numbers of lanes to each access ports 22A~22D. More numbers of lanes are assigned to an access port wider data transmission bandwidth is served to the corresponding peripheral device.

The embodiment shown in FIG. 1, the configuration module 20 includes multiplexing modules 24A~24C, 26 and 28. The multiplexing module 24A assigns the lanes L04~L07 to either the access port PE0 or the access port PE1 (that is, either to the access module 22A or to the access module 22B) according to the setting signal. The multiplexing module 24B assigns the lanes L08~L11 to either the access port PE0 or the access port PE2 according to the setting signal. The multiplexing module 24C assigns the lanes L12~L15 to the access ports PE0, PE2, or PE3 according to the setting signal. The multiplexing module 26 assigns the lane L16 to the access port PE1 or not according to the setting signal. The multiplexing module 28 assigns the lane L17 to the access port PE3 or not according to the setting signal.

Please refer to FIG. 2 to FIG. 5 for more detail showing lane configuring conditions in the present invention.

Figure 2:
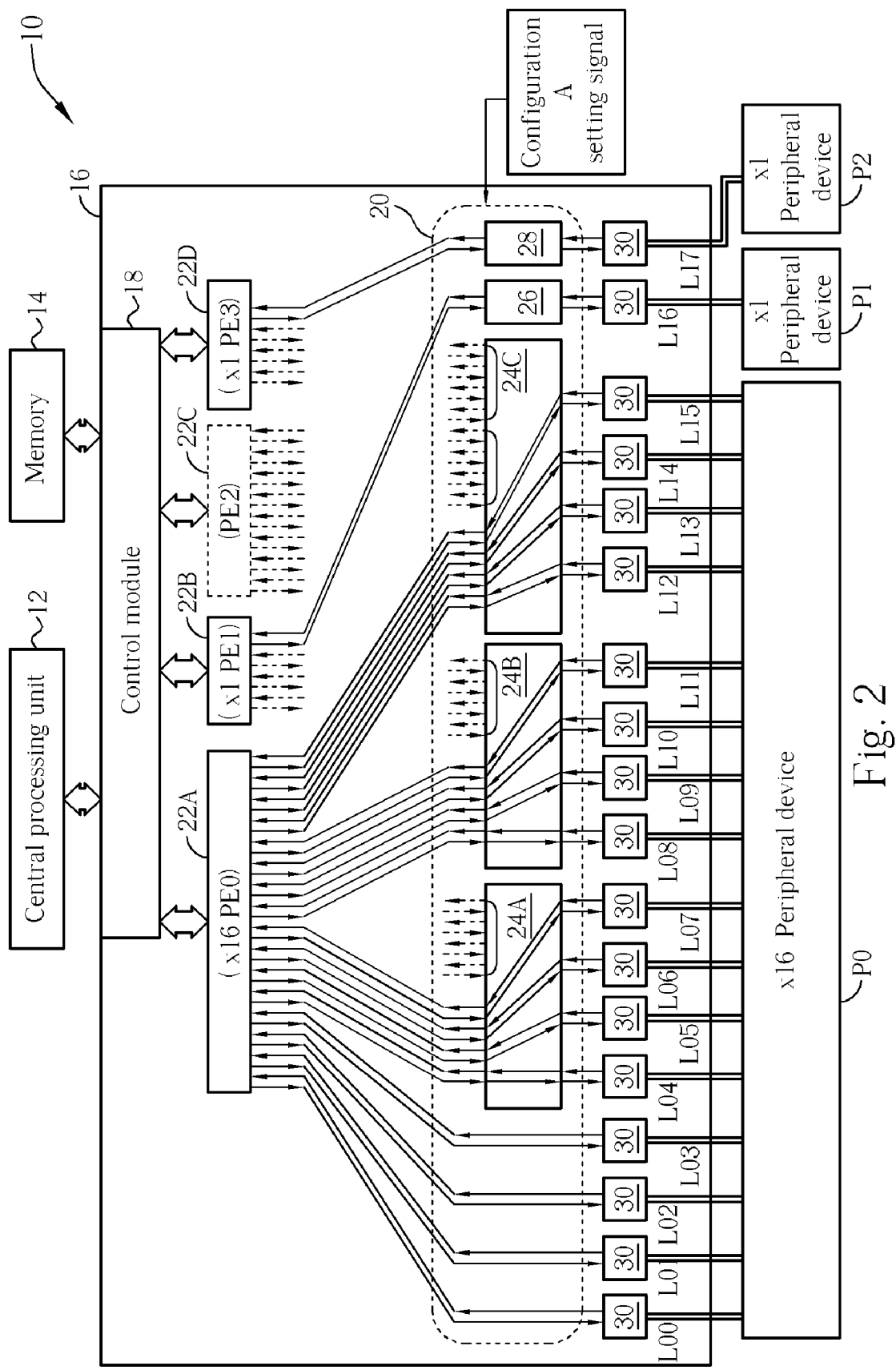
FIG. 2 to FIG. 5 are four schematic diagrams showing a variety of lane configurations realized by a chipset connected to a variety of access ports shown in FIG. 1.

As shown in FIG. 2, if the setting signal complies with a configuration A (as shown in FIG. 6), the multiplexing module 24A assigns the lanes L04~L07 to the access port PE0, instead of assigning to the access port PE1; the multiplexing module 24B assigns the lanes L08~L11 to be the access port PE0, instead of assigning the access port PE; the multiplexing module 24C assigns the lanes L12~L15 to the access port PE0 instead of assigning to the access port PE2 or the access port PE3; the multiplexing module 26 assigns the lane L16 to the access port PE1; and the multiplexing module 28 assigns the lane L17 to the access port PE3. Therefore, the access port PE0 has 16 connected lanes (lanes L00 to L15), and can provides 16 times data transmission bandwidth by those 16 lanes to serve the peripheral device P0. Furthermore, the access ports PE1 and PE3 with single lane can respectively serve single data transmission bandwidth to the peripheral devices P1 and P2. In the embodiment, under the configuration A, the access module 22C is configured to none of the lanes, so the access port PE2 is idle.

Figure 3:
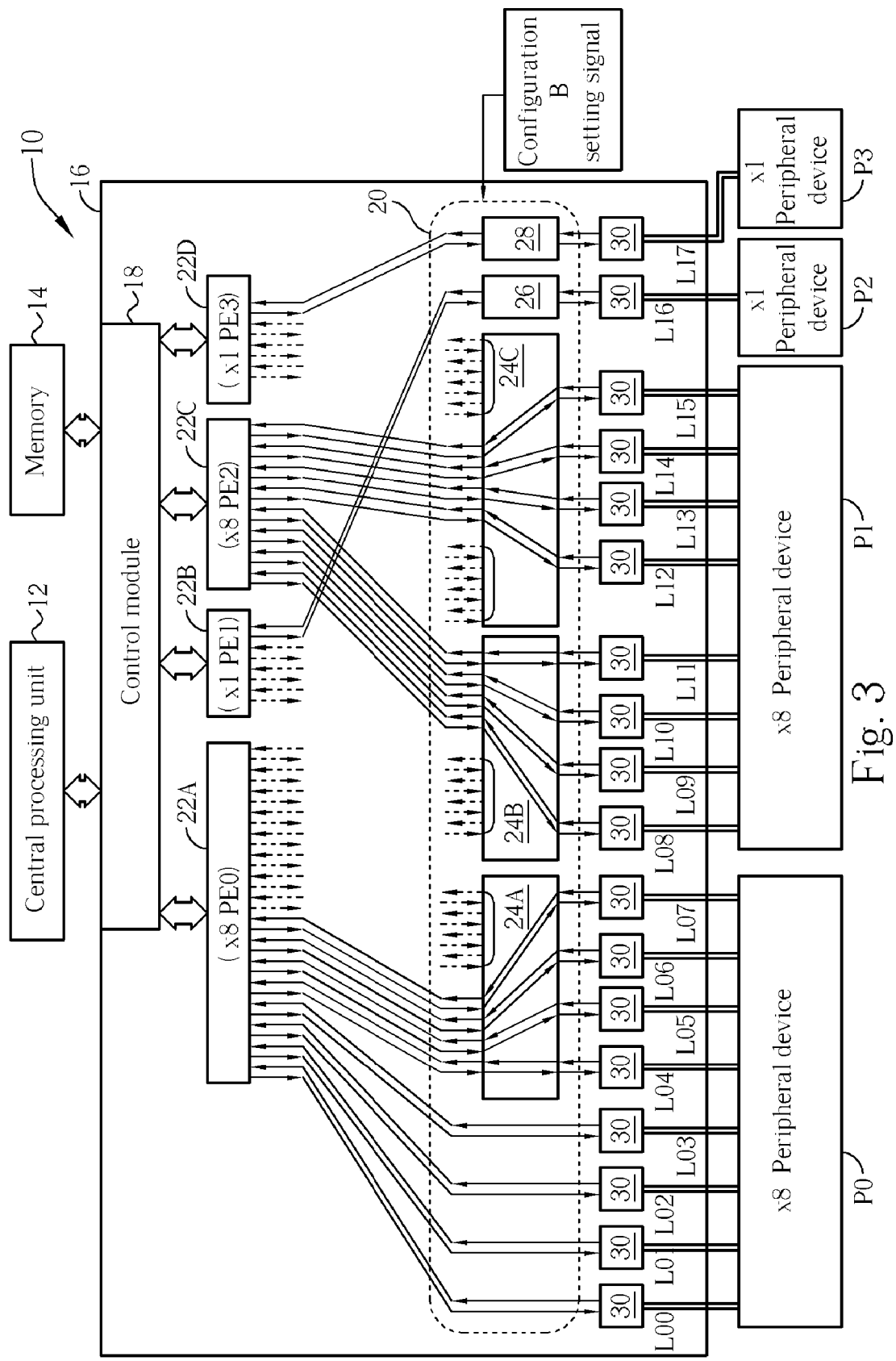

In FIG. 3, if a setting signal complies with a configuration B (as shown in FIG. 6), the multiplexing module 24A assigns the lanes L04~L07 to the access port PE0; the multiplexing module 24B assigns the lanes L08~L11 to the access port PE2; the multiplexing module 24C assigns the lanes L12~L15 to the access port PE2; the multiplexing module 26 assigns the lane L16 to the access port PE1; and the multiplexing module 28 assigns the lane L17 to the access port PE3. That is, under configuration B, the access port PE0 and the access port PE1 are configured to eight lanes, so that, the access port PE0 and the access port PE2 can serve 8 times data transmission bandwidth for the peripheral devices P0 and P1. Furthermore, access port PE1 and the access port PE3 can serve single data transmission bandwidth for the peripheral devices P2 and P3. In some applications, a computer system can use two display cards with eight times data transmission bandwidth to accelerate the video/audio processing efficiency. The configuration B shown in FIG. 3 can support two eight-lane access ports, and is useful for such computer system as mentioned above.

Figure 4:
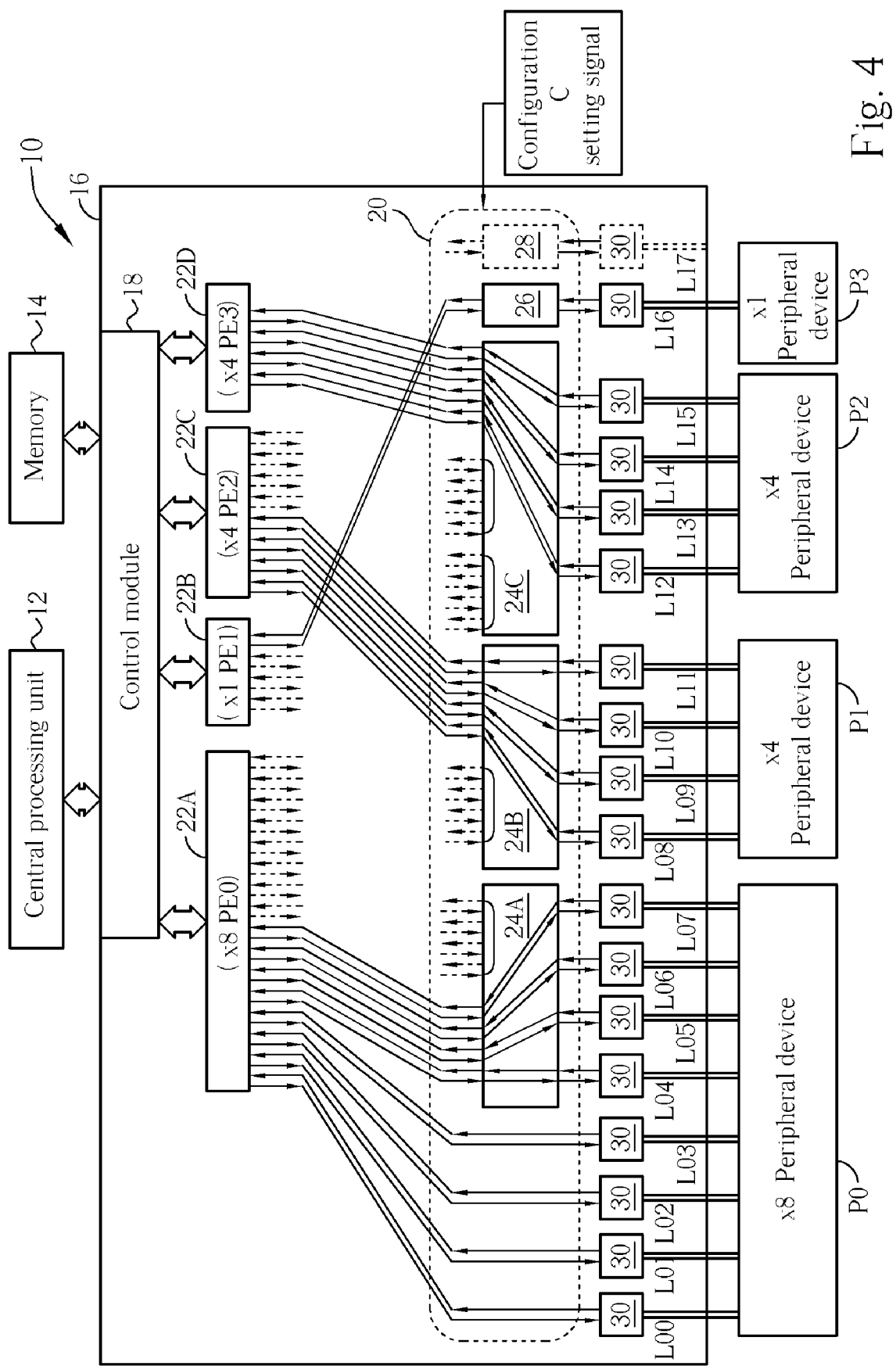

In FIG. 4, a setting signal complies with a configuration C (as shown in FIG. 6), the multiplexing module 24A assigns the lanes L04~L07 to the access port PE0; the multiplexing module 24B assigns the lanes L08~L11 to the access port PE2; the multiplexing module 24C assigns the lanes L12~L15 to the access port PE3; the multiplexing module 26 assigns the lane L16 to the access port PE1; and the multiplexing module 28 assigns the lane L17 to none of the access ports (idle). Under the configuration C, the chipset 16 of the embodiment provides the access port PE0 with eight lanes, the access ports PE1 and PE2 for each has four lanes, and the access port PE1 with single lane. As a result, the chipset 16 supports eight times data transmission bandwidth for the peripheral device P0, four times data transmission bandwidth for the peripheral devices P1 and P2 respectively, single data transmission bandwidth for the peripheral device P3.

Figure 5:
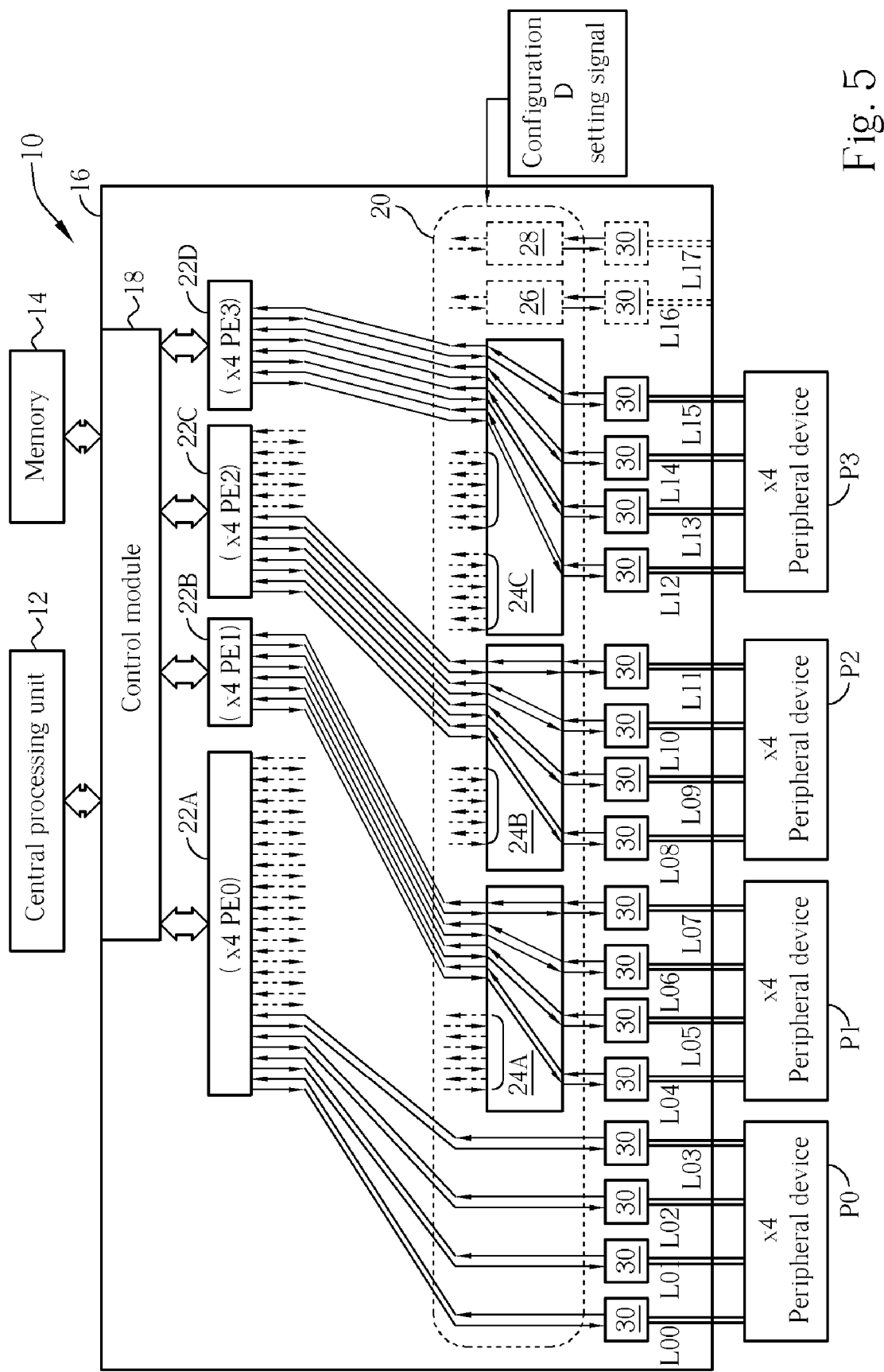

In FIG. 5, a setting signal complies with a configuration D (as shown in FIG. 6), the multiplexing module 24A assigns the lanes L04~L07 to the access port PE1; the multiplexing module 24B assigns the lanes L08~L11 to the access port PE2; the multiplexing module 24C assigns the lanes L12~L15 to the access port PE3; the multiplexing module 26 assigns the lane L16 to be idle (assigns L16 to none of the access ports); and the multiplexing module 28 assigns the lane L17 to be idle (assigns L17 to none of the access ports). Under the configuration D, the chipset 16 of the embodiment provides the access ports PE0, PE1, PE2 and PE3 for each has four lanes, respectively serving four times data transmission bandwidth for each corresponding peripheral device P0, P1, P2 and P3.

When a computer system applied in server, the computer system should include multiple access ports of four times data transmission bandwidth to support various network peripheral devices. The configuration D shown in FIG. 5 can be applied to the computer system.

FIG. 6 and FIG. 7 summarize the bus configurations of the chipset 16 shown in FIG. 1. FIG. 6 lists configurations of the lanes assigned to access ports. FIG. 7 lists the access port configurations supported by the present invention.

As shown in FIG. 6 and FIG. 7, under the configuration A, the lanes L00~L15 are assigned to the access port PE0, the lane L16 is assigned to the access port PE1, and the lane L17 is assigned to the access port PE3; in such case, one access port with 16 lanes, and two access port for each has single lanes are provided (the access port PE2 is idle). Under the configuration B, the lanes L00~L07 are assigned to the access port PE0, the lanes L08~L15 are assigned to the access port PE2, the lane L16 is assigned to the access port PE1, and the lane L17 is assigned to the access port PE; in such case, two access ports for each has eight lanes and another two access ports for each has single lane are provided. Under the configuration C, the lanes L00~L07 are assigned to the access port PE0, the lanes L08~L11 are assigned to the access port PE2, the lanes L12~L15 are assigned to the access port PE3, the lane L16 is assigned to the access port PE1, and the lane L17 is idle; in such case, one access port with eight lanes, two access port for each has four lanes, and one access port with single lane are provided. Under the configuration D, the lanes L00~L03, L04~L07, L08~L11, and L12~L15 are respectively assigned to the access ports PE0, PE1, PE2 and PE3 (wherein the lanes L16 and L17 are idle); in such case, four access ports for each has four lanes are provided.

Furthermore, the chipset 16 of the present invention still has another configuration C'. Under the configuration C', the lanes L00~L03 and L04~L07 are assigned to the access ports PE0 and PE1 respectively, the lanes L08~L15 are assigned to the access port PE2, and the lane L17 is assigned to the access port PE3 (wherein the lane L16 is idle). Similar to the configuration C, the configuration C' also provides one access port with eight lanes, two access ports for each has four lanes, and one access port with single lane.

As shown in FIG. 6, lanes assigning are seriously considerate in embodiments of the present invention. Thus, designs of multiplexing module and configuration module can be simplified; further gate counts of the configuration module can be reduced.

Otherwise, there is another embodiment for setting an independent multiplexing module on each lane. In this embodiment, each lane can be directly assigned to one of the access ports independently. Although such design makes more various configurations of the lanes and the access ports, the more complicated circuit layout and more gate counts are needed. In comparison with other embodiments of the present invention mentioned above, FIG. 6 shows the preferred design, which not only be used to assemble a variety of practical configurations, but also simplify the circuit of the configuration module. For example, it can be seen from FIG. 6 that the lanes L00~L03 are always configured to the access port PE0 under all configurations A, B, C (or C') and D, so that, there has no multiplexing module setting on the lanes L00~L03. The lanes L04~L07 are assigned to either the access port PE0 or the access port PE1. This can simplify the design of the multiplexing module 24A (shown in FIG. 1). Basically, the present invention groups each four lanes as a set, and installs four changeable lane sets and one or more than one independently changeable lane (such as the lane L16, L17 shown in FIG. 1) on the chipset 16 to assemble a variety of configurations of practical value.

In practice, the chipset 16 of the present invention can set pins for receiving the setting signals. By using a jumper mounted onto these pins, the configuration module can be controlled to perform any configuration.

For example, a motherboard manufacturer can mount the jumper onto specific pins to implement the configuration B (as shown in FIG. 3). That is, the configuration module 20 is set to the configuration B by the setting signal to perform appropriate switching functions.

In summary, the chipset of the present invention can includes N access ports (access modules) and M lanes with able to be connected to peripheral devices, and the configurations between the access ports and the lanes can be switched. That is, each access port is configured to have different numbers of lanes under different configurations. In contrast to the prior art, which adopts a fixed configuration of access ports and lanes, the present invention has different configurations of access ports with the same circuit design which can satisfy different requirements of a variety of computer systems. In addition to being applied to the chipset, the present invention can be applied to a switch of a bus. For example, according to the PCIE standard, a switch (or a fabric) supports an upstream access port and a plurality of downstream access ports. The upstream access port can be connected to an access port of the chipset, and the downstream access ports can be connected to a variety of peripheral devices to enable the peripheral devices to share an identical access port of the chipset. When designing such a switch, a designer can use the merits of the present invention to have different configurations of downstream access ports. In the present invention, the functions of the modules can be realized by hardware and firmware. For example, the multiplexing module can be realized by a plurality of multiplexers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A chipset of a computer system having a plurality of configurations, indicating lanes associated with access modules, the chipset comprising:
   a plurality of lanes for transmitting data;
   a plurality of access modules; and
   a configuration module coupled to the lanes and the access modules, the configuration module having a plurality of configurations for assigning lanes to access modules;
   wherein the configuration module receives a setting signal while the computer system is booting, and selects one of the configurations and accordingly assigns each lane to one of the access modules or to none of the access modules as specified in the selected configuration.

2. The chipset of claim 1, wherein the configuration module comprises a plurality of multiplexing modules for assigning the lanes to the access modules according to the selected configuration.

3. The chipset of claim 1 further comprising a plurality of PCIE access ports connected to external peripheral devices; each of the PCIE access ports corresponding to one of the access modules for providing bandwidth for the external peripheral device connected to the PCIE access port according to the number of lanes assigned to the access module.

4. The chipset of claim 1, wherein said lane is configured to only one of the access modules at one time.

5. A method of assigning lanes associated with access ports for a computer system with a plurality of configurations, the method comprising:
   deriving a setting signal while the computer system is booting; and
   selecting one of the configurations according to the setting signal, wherein each lane is assigned to either none or one of the access ports based on the selected configuration.

6. The method of claim 5 wherein a plurality of external peripheral devices are respectively connected to the access ports, and each of the external peripheral devices utilizes bandwidth of the assigned lanes of the connected access port for transmitting data.

7. The chipset of claim 1 wherein the chipset has a pin, and the setting signal is derived by mounting a jumper onto the pin.

8. The chipset of claim 1 wherein the configuration module selects another one of the configurations and changes the assignments of the lanes after the computer system re-boots.

9. The method of claim 5 wherein the setting signal is derived by setting a jumper.

10. The method of claim 5 further comprising selecting another one of the configurations and changing the assignments of the lanes after the computer system re-boots.

11. A computer has a plurality of configurations, indicating a plurality of lanes associated with a plurality of access ports, the computer system comprising:

a chipset for receiving a setting signal while the computer system is booting, wherein the chipset selects one of the configurations according to the setting signal and assigns each of the lanes to either none or one of the access ports based on the selected configuration;

wherein the chipset selects another one of the configurations after the computer system re-boots.

12. The computer system of claim 11 the chipset further comprising a plurality of access modules and a configuration module, wherein the access modules is coupled between the lanes and the access ports, and the configuration module is coupled between the lanes and the access modules.

13. The computer system of claim 12 wherein the configuration module comprises a plurality of multiplexing modules for assigning the lanes to the access modules according to the selected configuration.

14. The computer system of claim 11 wherein the chipset has a pin, and the setting signal is derived by mounting a jumper onto the pin.

15. The computer system of claim 11 comprising four access ports, eighteen lanes, five configurations, and a plurality of external peripheral devices connected to the access ports for data transmission.

16. The computer system of claim 15 wherein one of the configurations assigns first to sixteenth lanes to a first access port, assigns a seventeenth lane to a second access port, and assigns an eighteenth lane to a fourth access port.

17. The computer system of claim 15 wherein one of the configurations assigns first to eighth lanes to a first access port, assigns ninth to sixteenth lanes to a third access port, assigns a seventeenth lane to a second access port, and assigns an eighteenth lane to a fourth access port.

18. The computer system of claim 15 wherein one of the configurations assigns first to eighth lanes to a first access port, assigns ninth to twelfth lanes to a third access port, assigns thirteenth to sixteenth lanes to a fourth access port, assigns a seventeenth lane to a second access port, and assigns an eighteenth lane to none of the access ports.

19. The computer system of claim 15 wherein one of the configurations assigns first to fourth lanes to a first access port, assigns fifth to eighth lanes to a second access port, assigns ninth to sixteenth lanes to a third access port, assigns a seventeenth lane to none of the access ports, and assigns an eighteenth lane to the fourth access port.

20. The computer system of claim 15 wherein one of the configurations assigns first to fourth lanes to a first access port, assigns fifth to eighth lanes to a second access port, assigns ninth to twelfth lanes to a third access port, assigns thirteenth to sixteenth lanes to a fourth access port, and assigns seventeenth and eighteenth lanes to none of the access ports.

* * * * *